J. H. GILMAN.
LOCKING MECHANISM FOR CUP ELEVATORS.
APPLICATION FILED JUNE 9, 1915.
1,169,535.
Patented Jan. 25, 1916.
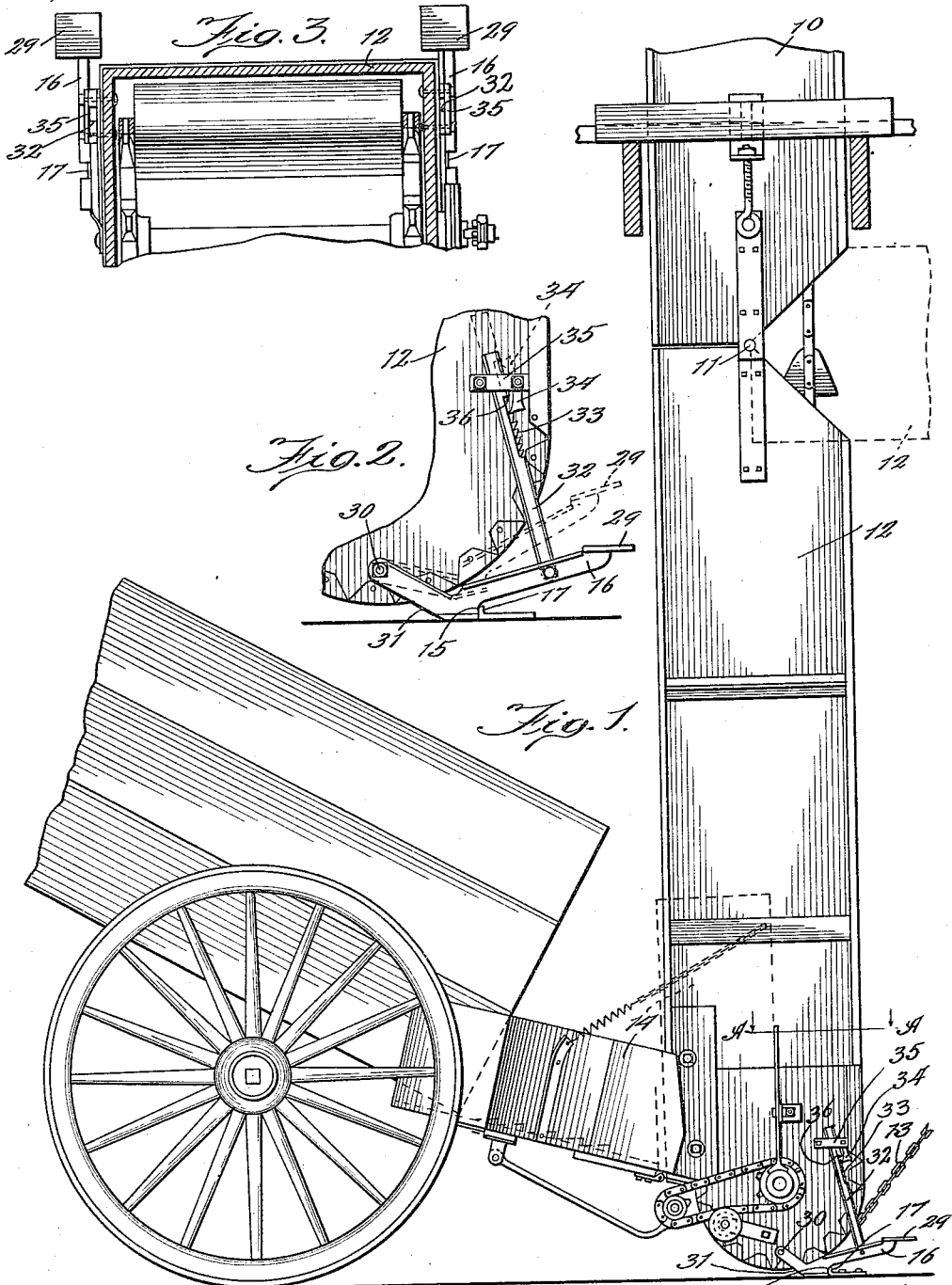

UNITED STATES PATENT OFFICE.

JOHN H. GILMAN, OF OTTAWA, ILLINOIS, ASSIGNOR TO KING & HAMILTON COMPANY, OF OTTAWA, ILLINOIS, A CORPORATION OF ILLINOIS.

LOCKING MECHANISM FOR CUP ELEVATORS.

1,169,535.  Specification of Letters Patent.  Patented Jan. 25, 1916.

Application filed June 9, 1915. Serial No. 33,031.

*To all whom it may concern:*

Be it known that I, JOHN H. GILMAN, a citizen of the United States, and a resident of Ottawa, in the county of La Salle and State of Illinois, have invented certain new and useful Improvements in Locking Mechanism for Cup Elevators, of which the following is a full, clear, and exact specification.

My invention is concerned with certain improvements upon elevators of the class shown in prior Patent No. 1,089,125, granted March 3, 1914, to myself and Albert E. Gilman, in which a portion of a vertical conveyer-trough and the included conveyer chains and cups, can be folded up out of the way to allow a wagon to be driven beneath it and into dumping position.

In the aforesaid patent is shown a locking mechanism to hold the swinging section down in operative position, but said mechanism requires careful hand manipulation, and my invention resides in a simple and efficient locking mechanism for such a purpose, that is largely automatic in its action, and which can be operated by locking foot-levers, making it more convenient and effective.

To illustrate my invention, I annex hereto a sheet of drawings, in which the same reference characters are used to designate identical parts in all the figures, of which,—

Figure 1 is a side elevation of a portion of an elevator having my locking mechanism applied thereto, and showing the rear end of a wagon in dumping position; Fig. 2 is a detail on an enlarged scale, showing the locking mechanism in side elevation; and Fig. 3 is a detail in top plan view, as seen in section on the line A—A of Fig. 1.

Elevators of the class shown in prior Patent No. 1,089,125 contain the vertical stationary portion 10 of the conveyer trough or framework, to which is pivoted at 11 the lower portion 12 of the same framework, which is adapted to be pulled by the chain 13 from the vertical operative position shown in full lines in Fig. 1 to the horizontal inoperative position indicated in dotted lines, to permit of a wagon being driven beneath the elevator and into the dumping position indicated. When the wagon has been driven into dumping position, the lower section 12 of the framework or trough is swung down from its dotted-line to its full-line position, the hopper 14 having been previously swung out so as to have its outer end extend beneath the tail of the wagon as the elevator section swings into place, where it is secured by the coöperation of the shoulders 15 on the locking levers 16 (of which there is preferably one on each side) with the locking lugs or projections 17, which are secured to the floor of the driveway.

The lower portion 12 of the conveyer frame is preferably counterbalanced by some suitable mechanism, and being thus counterbalanced so that it can be swung up without any difficulty, it becomes necessary to lock said section in its operative position, for which purpose I employ the previously mentioned locking levers 16. These levers preferably take the form of foot levers having treadles 29 at their outer ends, and having their inner ends pivoted to the bottom of the section 12 at 30. Each lever 16 is formed with a cam surface 31, which rides over the lug 17 and automatically raises the lever into locking position, so that when the shoulder 15 is passed, the lever can fall or be pressed into locking position. To retain the lever 16 in locked position, I pivot thereto the ratchet bar 32, which has upwardly-directed ratchet-teeth 33 adapted to coöperate with one of the noses of the gravity dog 34 pivoted to the framework 12, preferably in connection with the guide pieces 35 through which the ratchet bar extends. Above the ratchet teeth 33, I form the shoulder 36, and with this construction, it will be observed that when the foot lever is pressed down into locking position, it will be held by the engagement of one of the points of the dog 34 with the ratchet teeth 33. When it is desired to release the frame and swing it up into the dotted-line position shown in Fig. 1, the position of the dog 34 is reversed to the dotted-line position shown in Fig. 3, and the foot lever 29 is lifted up until the other point of the dog 34 engages the shoulder 36 to hold the locking lever in the disengaged position shown in dotted lines in Fig. 3.

The locking lever 16, in addition to holding the lower section 12 in its vertical position, also, as a result of the coaction of the dogs 34 and the teeth 33 on the bars 32, serves to support a part of the weight of the section 12 by reacting on the floor of the drive way, thereby wedging the lower section between the floor and the top section, and this action prevents any swinging or chattering, which would otherwise result from the action thereon of the reciprocating feeding mechanism associated with the hopper 14.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In an elevator, the combination with a depending frame pivoted at its upper end, of a fixed locking lug secured adjacent the position occupied by the bottom of the frame when in its vertical position but out of engagement therewith, a locking lever pivoted to the bottom of the frame, coöperating with the lug, the lever being pivoted on the frame so that it extends substantially parallel to the line of movement of its pivot when the frame is swung, and detent mechanism for holding the lever in locking position and pressing down upon the lug, thereby causing the lever to react against the lug to lock the frame against any tendency to swing in either direction.

2. In an elevator, the combination with a depending frame hinged at its upper end to a stationary support, of a stationary member secured adjacent the position occupied by the bottom of the frame when the latter is in its vertical position, a locking lever pivoted to the bottom of the frame and coöperating with the stationary member to hold the frame from movement, and a pivoted detent bar and catch coöperating therewith, with one end of the bar reacting against the lever and the other against the frame through the catch to hold the frame supported on the lever and thrusting the latter against the stationary member.

3. In an elevator, the combination with a depending frame pivoted at its upper end, of a fixed locking lug secured adjacent the position occupied by the bottom of the frame when in its vertical position, a locking lever pivoted to the bottom of the frame, coöperating with the lug, detent mechanism for holding the lever in locking position consisting of a toothed bar pivoted to the lever, guiding means for the bar on the frame, and a dog pivoted on the frame and adapted to coöperate with the teeth on the bar.

4. In an elevator, the combination with a depending frame pivoted at its upper end, of a fixed locking lug secured adjacent the position occupied by the bottom of the frame when in its vertical position, a locking lever pivoted to the bottom of the frame, coöperating with the lug, detent mechanism for holding the lever in locking position or out of possible engagement with the lug, said detent mechanism consisting of a bar having a shoulder and a series of teeth pivoted to the lever, guiding means for the bar on the frame, and a reversible dog pivoted on the frame and adapted to coöperate with the shoulder when reversed and with the teeth when in its normal position.

5. In an elevator, the combination with a depending frame pivoted at its upper end, of a fixed locking lug secured adjacent the position occupied by the bottom of the frame when in its vertical position, a locking lever pivoted to the bottom of the frame, coöperating with the lug and having a cam surface thereon engaging the lug as the frame swings to vertical position to lift it and allow it to fall into locking position after it passes the lug, and detent mechanism for holding the lever in locking position.

6. In an elevator, the combination with a depending frame hinged at its upper end to a stationary support, of a stationary member secured adjacent the position occupied by the bottom of the frame when the latter is in its vertical position, a locking lever pivoted to the bottom of the frame and coöperating with the stationary member to hold the frame from movement, and a detent bar and catch coöperating therewith, the bar being ratcheted to vary its effective length and pivoted with one end reacting against the lever and the other against the frame through the catch to hold the frame supported on the lever and thrusting the latter against the stationary member.

7. In an elevator, the combination with a depending frame pivoted at its upper end, of a stationary member secured adjacent the position occupied by the bottom of the frame when in its vertical position, a locking lever pivoted to the bottom of the frame, coöperating with the stationary member, detent mechanism for holding the lever in locking position consisting of a toothed bar pivoted to the lever, guiding means for the bar on the frame, and a dog pivoted on the frame and adapted to coöperate with the teeth on the bar.

8. In an elevator, the combination with a depending frame pivoted at its upper end, of a stationary member secured adjacent the position occupied by the bottom of the frame when in its vertical position, a locking lever pivoted to the bottom of the frame, coöperating with the stationary member, detent mechanism for holding the lever in locking position or out of possible engagement with the stationary member, said detent mechanism consisting of a bar having a shoulder and a series of teeth pivoted to the lever, guiding means for the bar on the frame, and a reversible dog pivoted on the frame and adapted to coöperate with the shoulder when reversed and with the teeth when in its normal position.

In witness wehreof I have hereunto set my hand and affixed my seal this 4th day of June, A. D. 1915.

JOHN H. GILMAN. [L. S.]

Witnesses:
  AUGUST LEDRICH,
  ED R. CLAUS.

Copies of this patent may be obtained for five cents each, by addressing the "Commissioner of Patents, Washington, D. C."